April 14, 1953 P. SCHWEIZER 2,634,971
MACHINE FOR STUFFING NEWSPAPER OR SIMILAR
SHEET MATERIAL ASSEMBLAGES
Filed Aug. 6, 1949 8 Sheets-Sheet 6
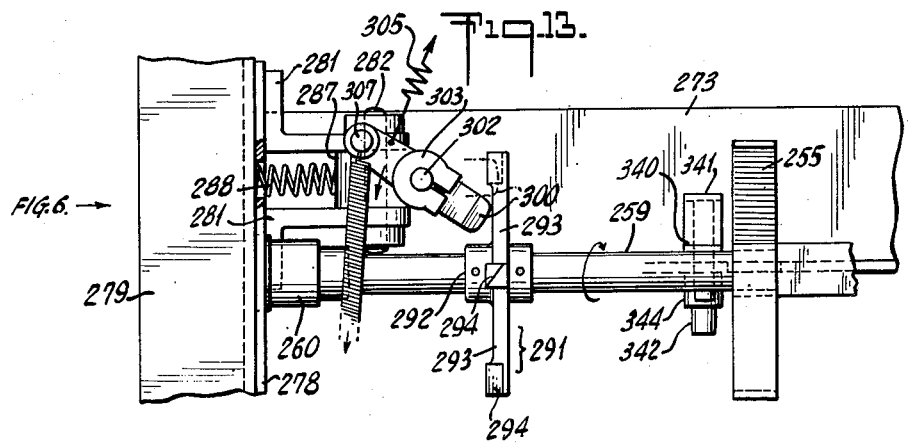
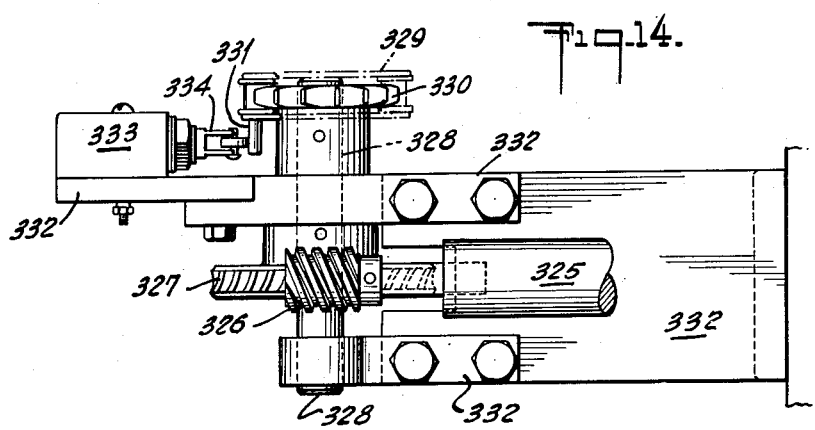
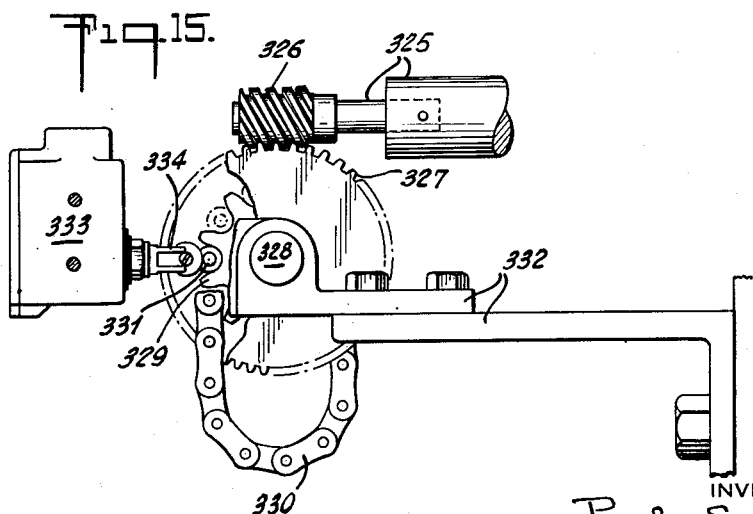
INVENTOR:
Paul Schweizer
BY Morrison,
Kennedy & Campbell
ATTORNEYS.

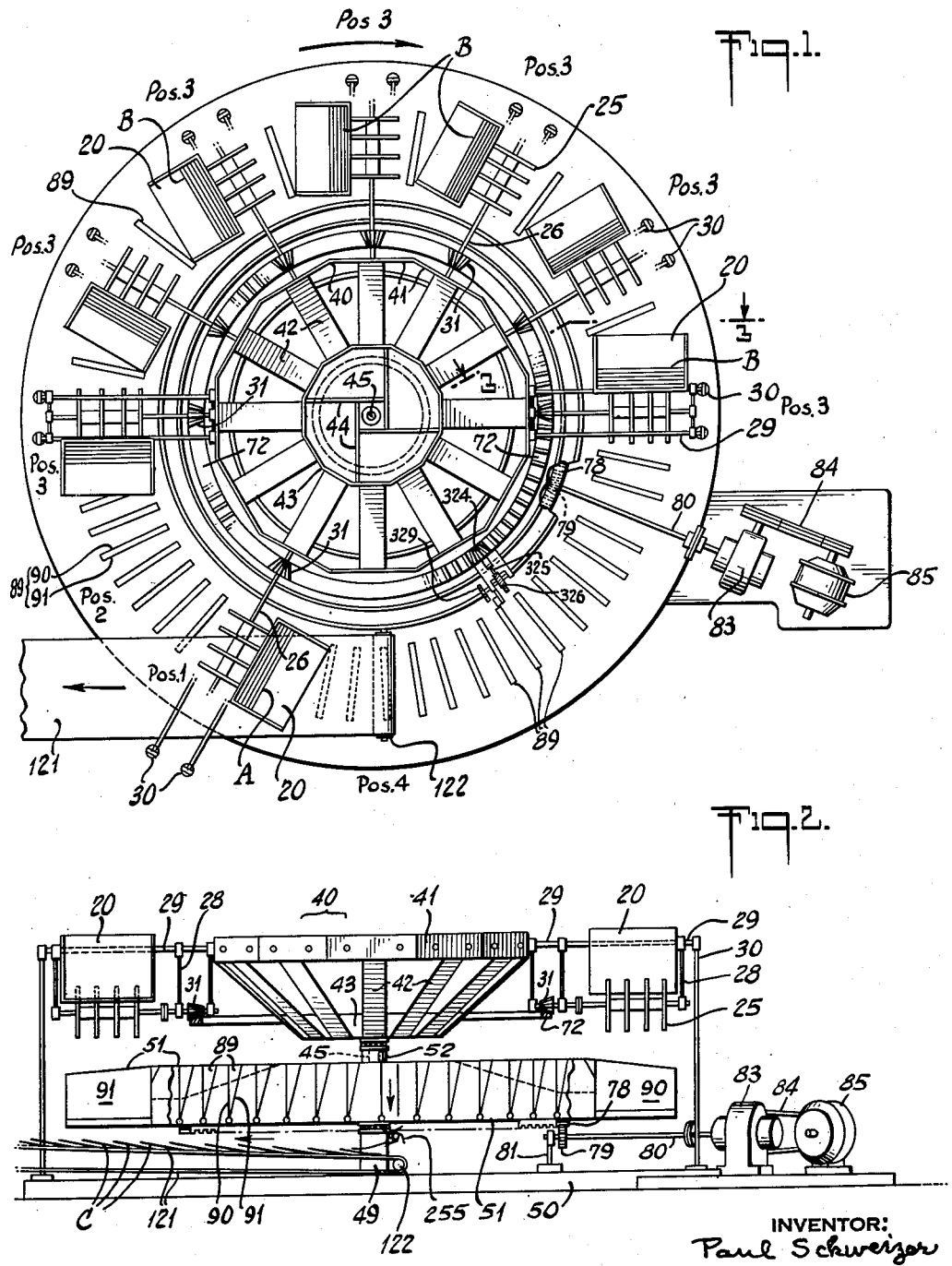

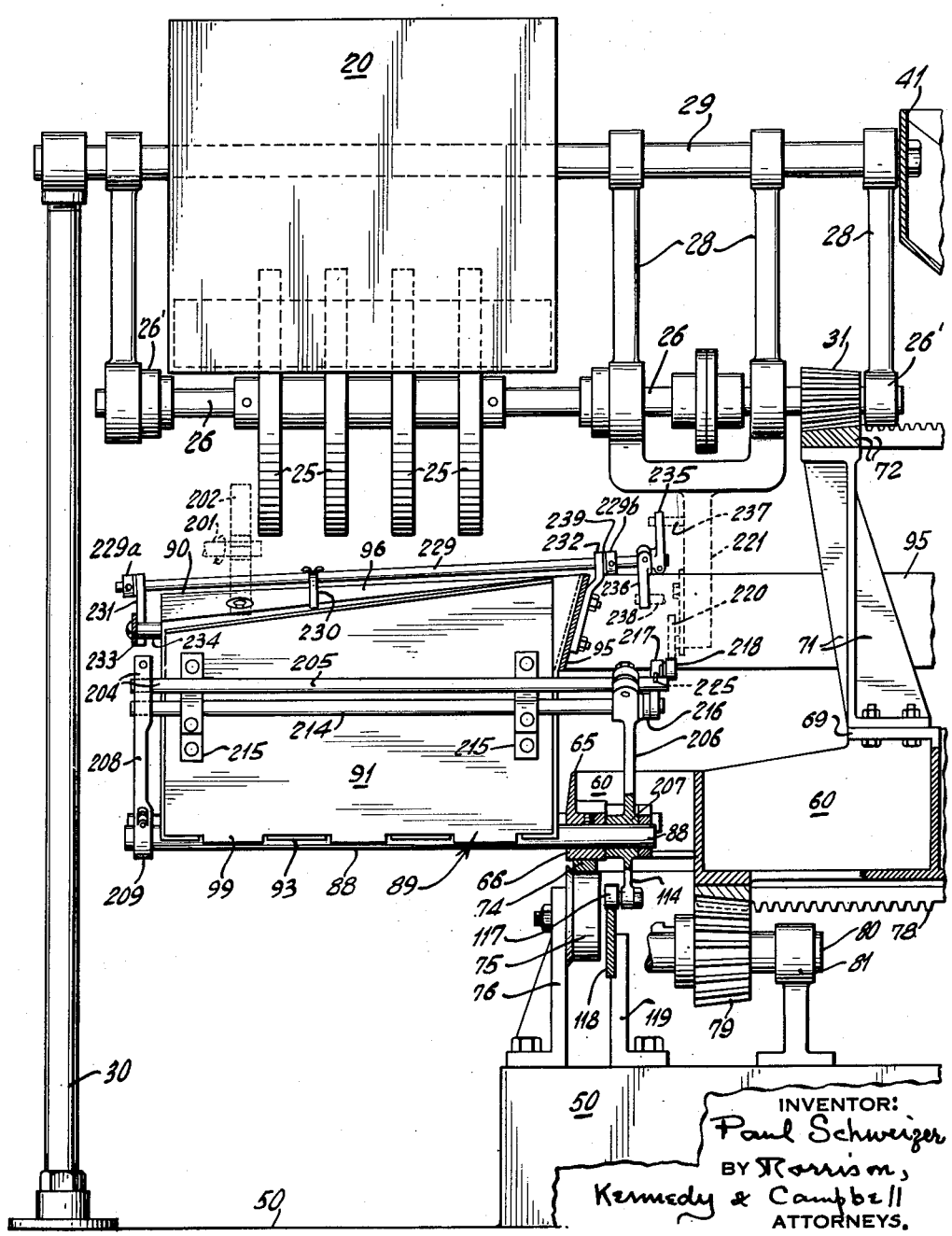

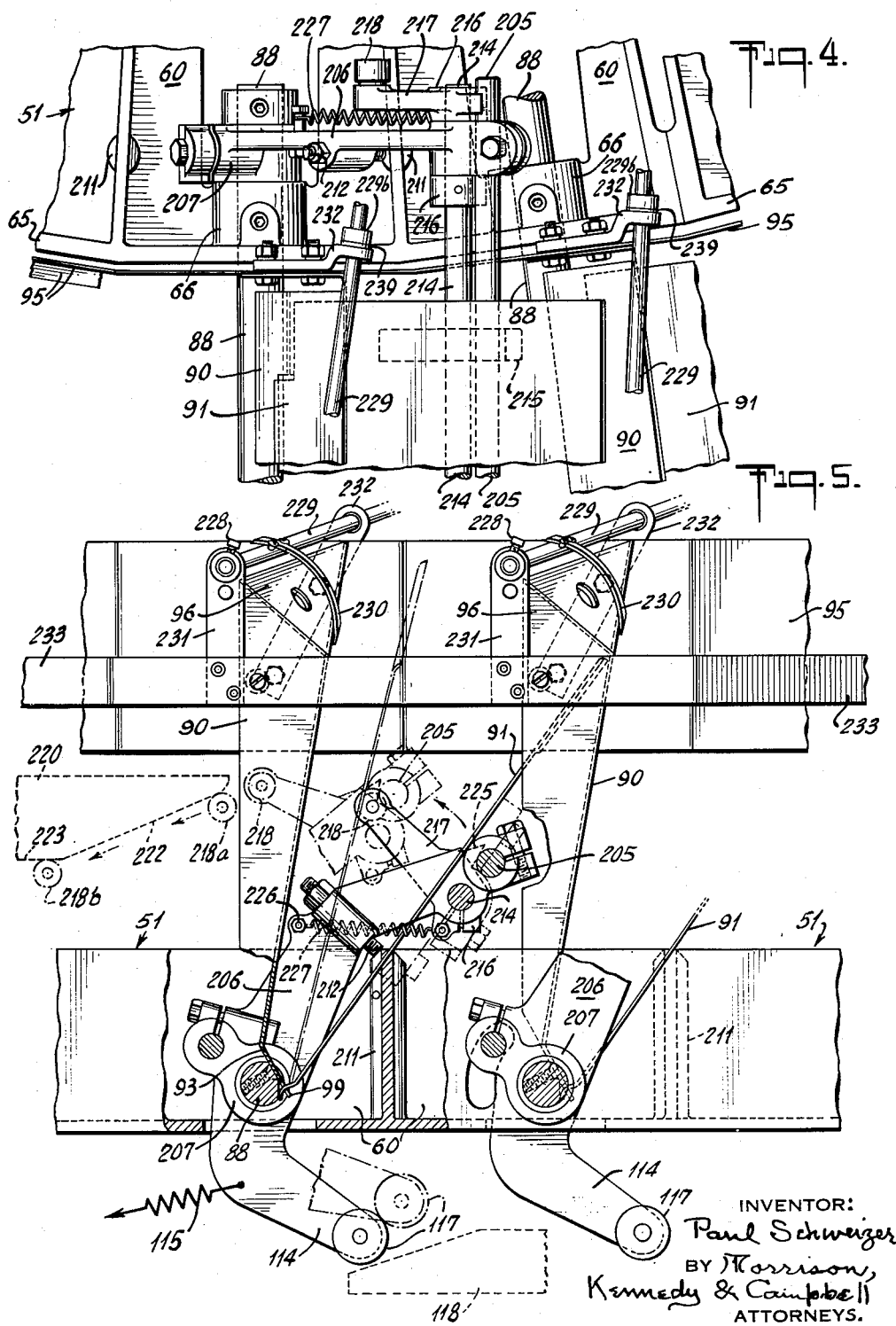

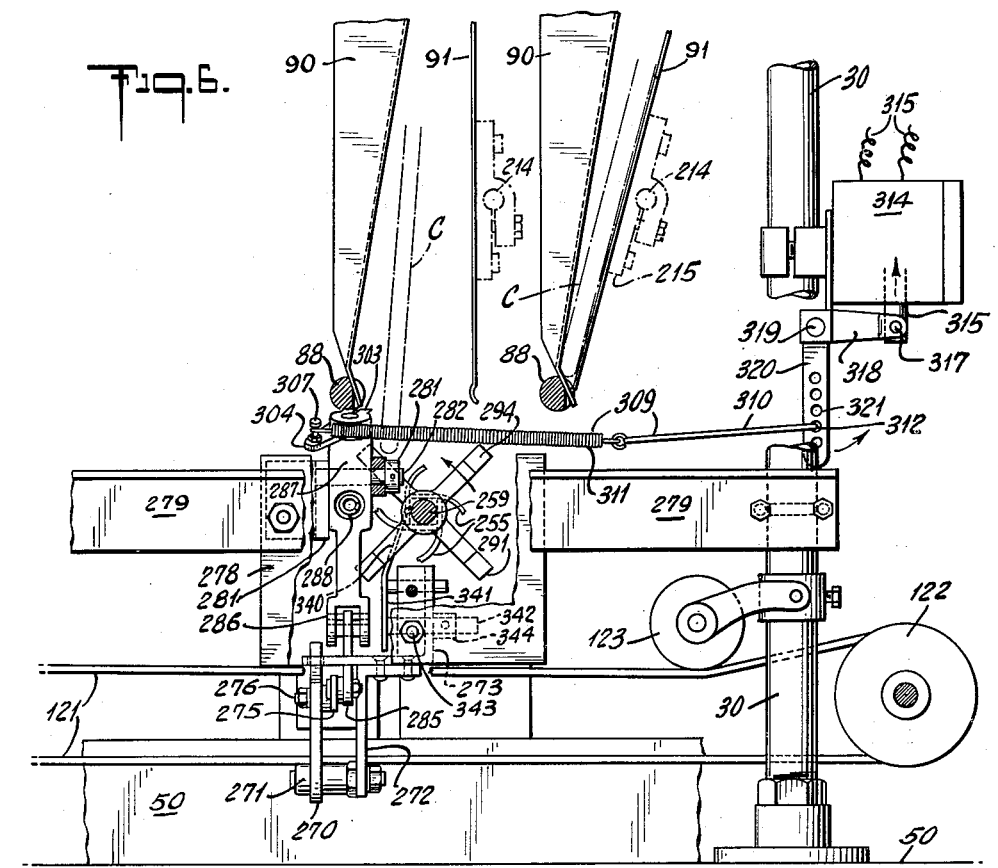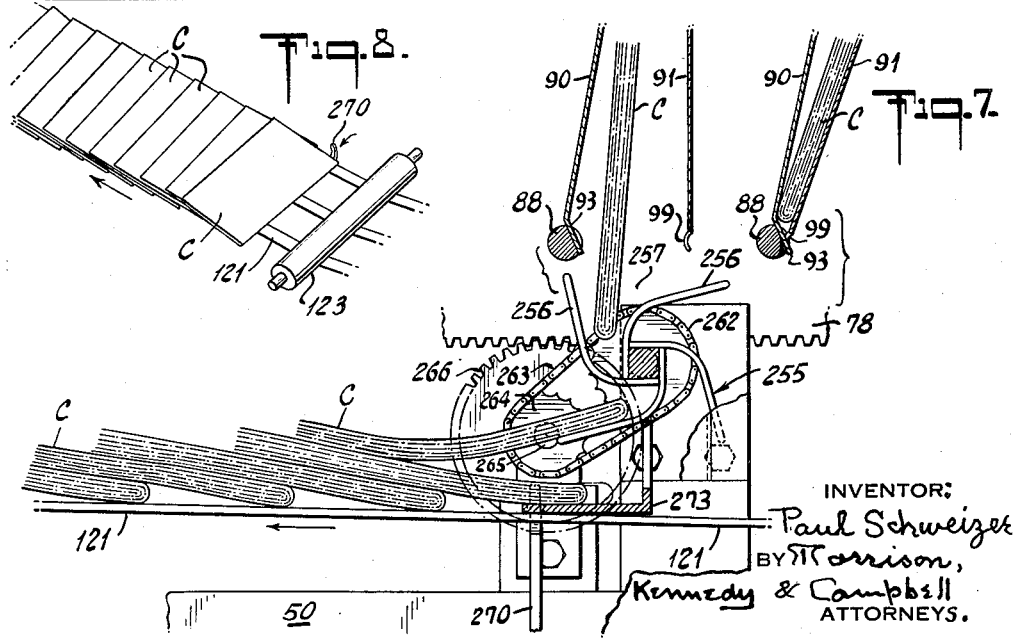

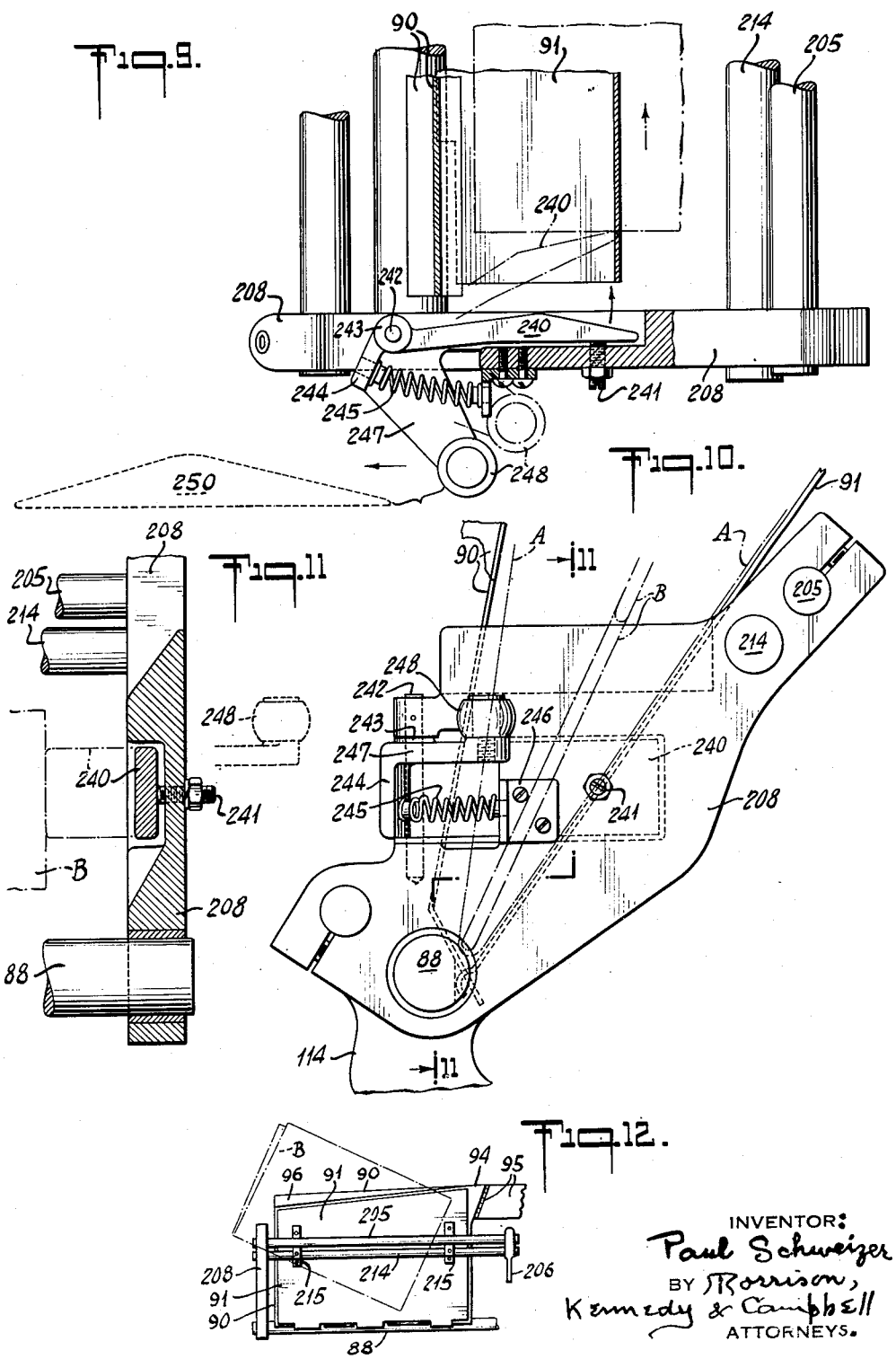

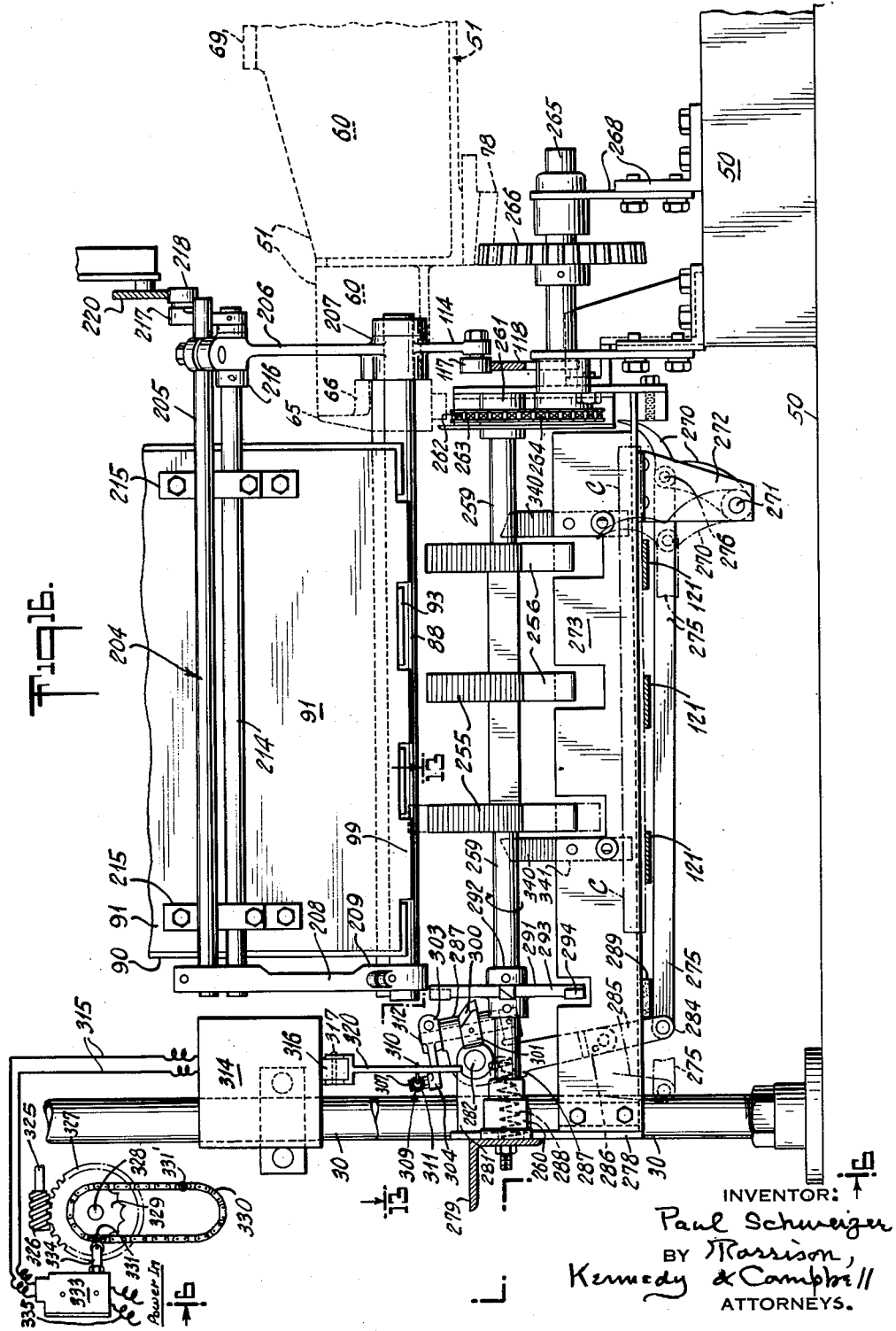

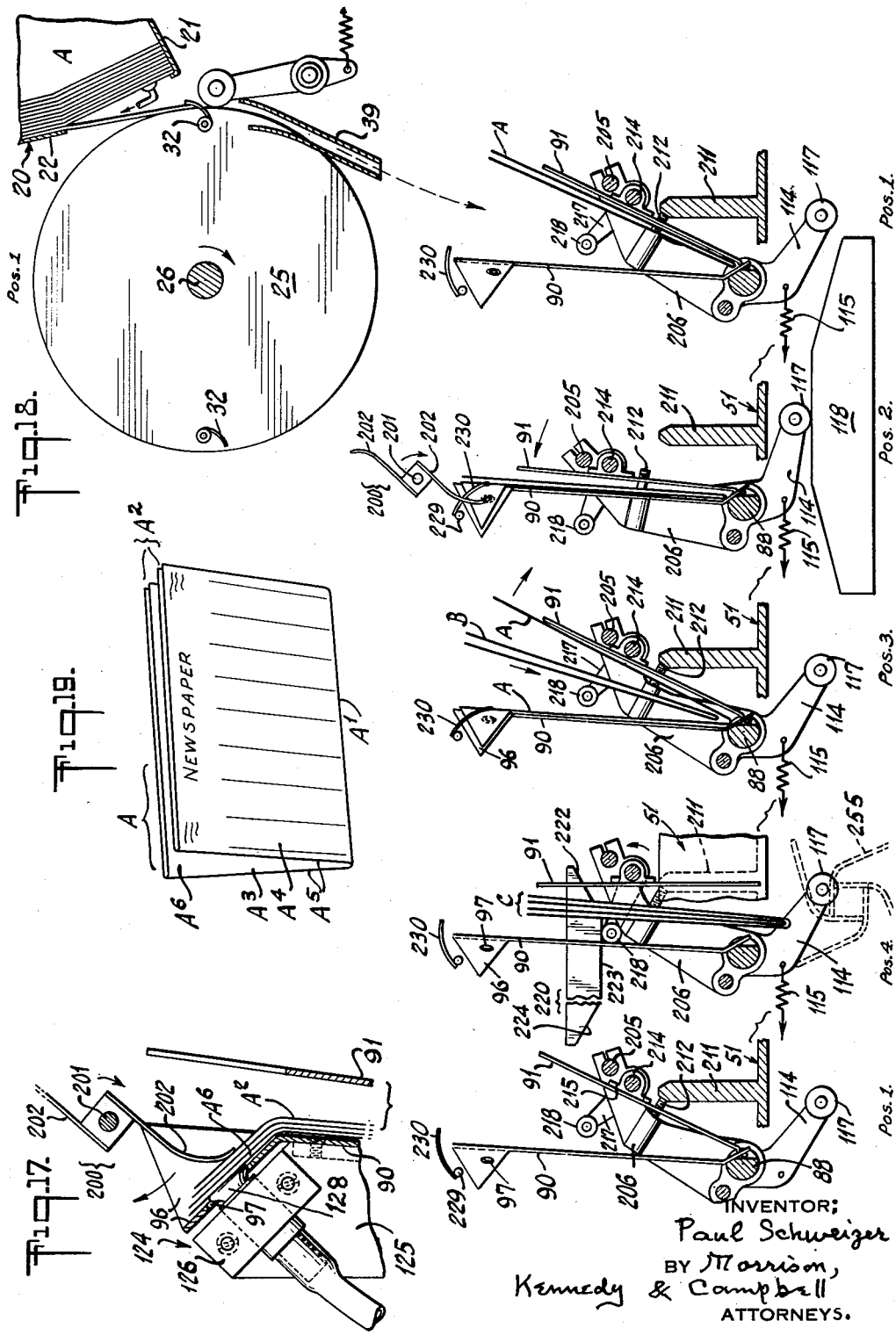

Patented Apr. 14, 1953  2,634,971

UNITED STATES PATENT OFFICE 2,634,971

MACHINE FOR STUFFING NEWSPAPERS OR SIMILAR SHEET MATERIAL ASSEMBLAGES

Paul Schweizer, Easton, Pa., assignor to T. W. & C. B. Sheridan Company, New York, N. Y., a corporation of New York Application August 6, 1949, Serial No. 109,038

25 Claims. (Cl. 270—55)

This invention relates to machines for stuffing newspapers or similar sheet material assemblages; having reference more particularly to the insetting and enclosing, loosely within the folded outer cover or jacket section of a plural-section newspaper or the like, of one or several inner sections; and thus, in the case of a newspaper, associating and assembling complete sets or assemblages of the sections of the newspaper; each set being accumulated as a segregated group wherein the outer cover or jacket accommodates inside of it the other sections of the assemblage. Such operations are known as stuffing, the general principles thereof being long well known, and illustrated for example in a prior patent of this applicant, filed April 2, 1945, patented February 15, 1949, No. 2,461,573, the specification of which makes reference to specific earlier disclosures in the art. The present invention may in general be considered as an improvement upon stuffing machines of the type of said prior patent, the features of the present invention however being applicable to other types of newspaper stuffing machines.

The said prior patent may be generally outlined as disclosing in an automatic apparatus certain characteristic cooperating elements describable in the following manner, the wording of which applies also to the herein illustrated embodiment of the present invention. An endless series of assemblage-conveying upright pockets, each double-acting to close and open alternately at top and bottom, travels facewise around a horizontal orbit, so that each top-open pocket can receive edgewise, from successive infeeding means above, at a first receiving station the jacket and, after such jacket is opened to V-form in the pocket, the further sections, all during pocket travel along a route beneath the successive infeeding means or hoppers; until, at a delivery station, each pocket of the series is reversed to release its assembled contents and by bottom-opening to discharge and drop the assemblage, to be delivered to and received by an operative outfeeding mechanism which carries away in procession the completed products. Each pocket has a pair of upstanding walls, front and rear, initially in V-form or relation, but fitted for relative wall swinging to close and open the pocket above and wall tilting to open and close the pocket below. A driven rotor is used as an effective means of advancing the pockets around their endless path, with continuous travel and output; each pocket standing radially and thus traveling facewise, in the form of complementary or opposed leading and trailing walls, around the rotor periphery. Thus the mechanisms are coordinated as to the pocket travel, and the opening and closing actions and the infeeding, discharging and outfeeding functions; such coordination including operations such that after each top-open pocket receives its jacket, with fold down, and while it travels ahead, its swinging wall, which preferably is its trailing wall, is operated to approach its other wall until it closes the jacket and then to swing away to reopen the pocket to cause the opening of the jacket to V-form with one half of the jacket engaged with each wall; and with auxiliary means to ensure the described opening of the jacket. Specifically such wall swinging is about a low axis near the line of wall intersection. After next receiving the inner sections deposited within the jacket each pocket finally reaches the delivery station, whereat one of the pocket walls, preferably the rear or trailing wall, tilts about a high or mid axis thus to open the pocket below and release each completed assemblage for discharge, further action and final outfeed.

The general objects of the present invention are to improve the operation and efficiency of the known prior art including the stuffing machine disclosed in said Patent 2,461,573, which is believed to be the prior instance nearest to the present invention; and to provide automatic stuffing apparatus possessing superior simplicity and ruggedness, along with good working qualities and reliability in action. Additional general objects are to afford an increase in the rate of output and to avoid certain inconveniences and other drawbacks pertaining to the prior art.

A special object of the present improvement is to increase efficiency and certainty of action in the feeding into and receiving of sections by each of the successive traveling pockets, and there adjusting them for correct assembling before discharge. Another special object is to improve the structure and operation of the mechanism by which each of the series of pockets is actuated to open and close at both the top and the bottom thereof, for the purposes of first receiving and accumulating the sections and later delivering and advancing the assemblage toward the outfeeding means, this object being accomplished by changes of structure and action including a novel cam means acting to control the pocket openings and closings produced by reason of the travel of the pockets around the continuous orbit.

Another important aim and advantage over the prior machine relates to the transfer of the successive delivered assemblages from the traveling pockets to the outfeeding means, this referring to an intermediate driven mechanism, preferably rotary, arranged below the pocket path of travel and operating to manipulate and conduct downwardly the successive released assemblages, at the delivery station, and therebelow easing and depositing the successive assemblages methodically upon an outgoing conveying web or outfeed carrier. In association with such purposes the present invention embodies a counting or assemblage arranging or disposing mechanism, driven from or with the transfer means; this mechanism being constructed and arranged to afford regular displacement or lateral adjustment of periodic ones of the assemblages, such as every tenth one, this being an action in the nature of thrusting or kicking out of the traveling line such periodic assemblages, in order to mark off in the procession thereof a series of uniform batches or groups, as of ten each, to the great convenience of the operatives in the manual or automatic performance by which these assemblages thus segregated or subdivided into groups are piled or methodically transported away for sale or other disposition. For this displacing or thrusting action it is an object to provide an adjustable controlling trip means, timed with the delivery rate and magnetically controlled; the products being delivered to the conveyor in the direction of outfeed, to overlie each other, each periodic one being thrust into a visibly out-of-line position.

Certain minor devices are desirable to insure proper action upon each jacket; one of these being a driven wiper device to bend the jacket corner over to the suction device, thus dispensing with the bent ear 100 shown in said patent formed on the trailing wall. Another jacket positioning device, supplemental to the suction device, and cooperative with the wiper device, is a curved finger or overreaching hook mounted at the top of the leading wall and automatically swung to hold or clamp the leading half of the jacket to the leading wall, making sure that the inner sections are subsequently received correctly within the jacket, until the quota is complete and the delivery station is reached.

It is a further object to provide a device or guide for each pocket which serves to prevent failure of action by reason of the defective infeed of a jacket or of an inner section within a jacket, especially in the case that the inner section is radially too far inward, tending to block the pocket or to leave the section in a displaced position, likely to interfere with the subsequent discharge of the assemblage from the pocket. This guide device, applied to all of the pockets, may be a strip attached to the outer edges of all the fixed or leading walls around the periphery, and cooperates with the section adjusting or aligning means already mentioned.

Other and further objects and advantages will be explained in the following description of an illustrative embodiment or will be understood by those conversant with the subject. To the attainment of such objects and advantages the present invention consists in the novel stuffing machine and the novel features of operation, combination, arrangement, mechanism and detail herein illustrated or described.

In the accompanying drawings contained on eight sheets, there is disclosed an illustrative embodiment of the present invention wherein the figures are described as follows:

*Sheet 1.*—Fig. 1 is a general top plan view on a small scale, corresponding to Fig. 1 of said prior Patent No. 2,461,573 and illustrating a stuffing machine embodying the features of improvement over said prior patent and showing the general arrangement of the frame and the mechanisms of the machine, the mode of drive of the assemblage-conveying rotor and other rotating parts, the hoppers and associated infeed means for newspaper sections, and the means for outfeeding the stuffed newspaper assemblages. Fig. 2, on the same scale, is a front elevation of the machine of Fig. 1 partly in general vertical section and partly broken away to show interior parts, and corresponding to Fig. 2 of the patent.

*Sheet 2.*—Fig. 3, on an enlarged scale, is a vertical section taken on the radial line 3—3 of Fig. 1, corresponding with a portion of Fig. 5 in said prior patent, but looking from the rear, showing the infeed and a pocket.

*Sheet 3.*—Fig. 4 is an enlarged top view of parts of the pocket operating and controlling mechanism; while Fig. 5 is an exterior elevation of the same, that is, looking radially inwardly toward the general center or axis of the machine, and with some parts broken away.

*Sheet 4.*—Fig. 6 is an exterior elevation and part section showing the lower parts of successive pockets and therebelow the operating means for the discharge of each assemblage from its pocket to the delivery mechanism, for transfer to the outfeeding carrier or belt, the figure being broken away to show parts beyond. Fig. 7, on the same scale, shows in exterior front elevation, the delivery means for disposing the successive assemblages methodically upon the outfeeding conveyor belt. Fig. 8 on a smaller scale, is a perspective view of a detail of the outfeeding mechanism, showing the overlapping lay of the products thereon, traveling leftward on the webs or bands constituting the conveyor.

*Sheet 5.*—Fig. 9 is a top plan view of a part of the radially outer end of one of the pockets and showing an associated self-acting means for aligning in the pocket the successive sections as deposited therein so that each assemblage will have been neatly grouped for delivery and outfeed. Fig. 10 is an exterior elevation of the same parts, showing a re-design of the pocket front end lever as compared with that of Fig. 5. Fig. 11 is a sectional view taken on the section line 11—11 of Fig. 10. Fig. 12 is an explanatory elevation on which along with Fig. 10 shows the nature of an infeed defect that occurs occasionally by reason of the blocking and consequent tilting or cocking of the outer end of a descending section, which defect is more readily observable by reason of the aligning of the sections in the pocket and is correctable by hand or device.

*Sheet 6.*—Fig. 13 is a top plan view, partly in section on the line 13—13 of Fig. 16, of parts of the tripping means through which, at regular counted intervals, the kicker mechanism is brought into play to kick or displace laterally a periodic one of the sequence or procession of outfeeding assemblages. Fig. 14 is a top plan view of details of the counting or indexing mechanism which controls the timing of the tripping mechanism, with means for predetermining the intervals of displacement of delivered assemblages; and Fig. 15 is an elevation of the same.

*Sheet 7.*—Fig. 16 is a general elevation of certain lower parts of the machine, at the delivery position, and looking laterally to a general radius, showing one pocket and parts of the delivery mechanism and of the counting, tripping and kicking or assemblage-displacing mechanism associated therewith.

*Sheet 8.*—Fig. 17 is a detached vertical section showing a suction device and other elements taking part in the opening of each jacket section, including an automatic section-bending or wiping device to operate on the jacket, this figure corresponding with Fig. 11 of said prior patent. Fig. 18 is an extensive exterior elevational view and development corresponding with Fig. 12 of the patent, partly of diagrammatic character, and partly in section, showing the successive positions through which each pocket passes in traversing its orbit; the receiving pocket at position 1 being in its top-open condition ready to receive the jacket section from the first of the overhead hoppers and extracting devices, as shown; and this figure being also extended leftwardly as a combined development showing subsequent pocket positions 2, 3 and 4, and finally position 1 repeated, in each of these cases the developed view being taken looking radially inwardly, and with the pocket operating fixed cams 118 and 220 indicated in positions 2 and 4. Fig. 19 shows a newspaper jacket section in perspective view.

Various general and detail matters of disclosure follow basically said prior patent, wherefore they will usually be omitted from this specification, leaving it to cross-reference to the patent to supply the omitted parts. Mechanical elements and parts are designated by reference numbers, but for convenience lettering is used for the newspaper component parts and complete assemblage. Fig. 19 herein shows separately a complete jacket section A, and this and inner sections B appear in various figures wherein the sections are acted upon; and when the jacket has been fully supplied or stuffed with inner sections this assemblage is designated C. The jacket has its parts designated by letters, which is not necessary with the inner sections that require no such special handling as does the jacket or cover. The latter has its closed lower edge A', which is really the final refold, made after the section has been completed. It rests edgewise in the open V-pocket into which it is fed. The jacket has the openable upper edge $A^2$, at which the upper portions of the deposited section meet, this edge $A^2$ being closed during infeed but later becoming opened into V-form to receive the inner sections. The two halves of each jacket as folded are referred to as the leading half $A^3$ and the trailing half $A^4$, since these parts advance facewise as the radially arranged pockets travel clockwise with the conveying members of the machine. The so-called backfold $A^5$ consists of the full length of the back edge of the jacket prior to the refolding of the section about its lower closed edge A'. This backfold $A^5$, as explained in said patent, must be at the radially outer part of the edgewise-deposited jacket section. This section has to be opened in V-form in the pocket, before inner sections are deposited, and for this operation an upper corner $A^6$ is utilized, being a small area adjacent to the backfold $A^5$ and near the upper edge of the leading jacket half, as marked in Fig. 19. By mechanical and/or suction means as seen in Fig. 17 this important corner $A^6$ is held against a corresponding corner 96 of the leading wall of the pocket, while the trailing half of the section swings away to create the receiving space for the inner sections.

For separating from each supply and feeding newspaper sections into the successive pockets 89, which are shown of V-type each with a leading wall 90 and a trailing wall 91, a hopper 20 is provided, which may be conventional, positioned above each infeeding station around the orbital path of travel, the sections preferably standing edgewise and in succession being detached, extracted and guided downwardly into the respective pockets; the jacket section being first supplied to each pocket and therein opened into V-shape to receive the inner sections. Each hopper has a bottom wall 21 and thereabove a front wall 22, with a gap between them for the extraction of the sections. A sucker device conventionally swings frontwardly the lower edge of each section which thereupon is engaged by a gripper 32 carried on an extracting drum 25 shown as an open structure of several disks rotatable near the hopper exit. A driven shaft 26 carries the drum and turns in bearings 26' carried by hangers 28 supported by an overhead pair of radial frame rods 29 each supported in turn by a tall standard 30. When each section is released by an outfeeding gripper it is directed by a chute 39 into the top-open pocket 89 beneath, traveling in time with the extraction and deposit of the sections.

At its inner end each drum shaft 26 carries a pinion 31 through which the shaft is gear-driven as from a large upper ring gear 72 mounted atop a circular series of standards or brackets 71 upstanding from the large rotor or carriage 51 on which the radial pockets 89 are mounted. A second ring gear 78, at the rotor lower part, see Figs. 1, 2 and 3, conveys the drive to the rotor. A pinion 79 meshes with gear 78 and is fast on a radial drive shaft 80 turning in a bearing 81; shaft 80 being coupled to the slow member of a speed reducer 83 the fast or input shaft of which is driven as through a belt 84 from a drive motor 85 which may be the source of substantially all actuations and timing of the mechanisms of the machine. These driving means and actuating connections are illustrative only, as various substitutes are mechanically available for transmission of motions with coordinated timing. After each of the successive products or assemblages has been accumulated in each pocket it is dumped or discharged by the pocket to intermediate transmitting or delivery means to be described which places or deposits them overlappingly upon a general outfeeding conveyor 121, as an endless belt or bands, passing around guide pulleys or rollers 122, with a tensioning take-up 123.

The general frame of the machine comprises certain main parts and various extensions to be described. There is shown an elevated central member or headframe 40, which is open above and below and is provided with an upper rim 41 formed with flat sides, in this case twelve in number, eight of these giving support to the inner ends of the radial frame rods 29 already mentioned, which give support to the drum shaft bearings 26'. The headframe has downwardly sloping side braces 42 interconnecting the upper rim 41 with a 12-sided flanged bottom member 43, braced by webs 44.

This headframe 40 is mounted atop a central stationary post 45, which also constitutes a vertical axle for the rotor hollow hub 52 consisting of connected inner and outer concentric walls forming the central portion of the rotor 51. At its top end the post 45 has a shoulder upon which the bottom member 43 of the headframe is clamped as by a threaded nut. Below, the upright axle 45 is set down into a foot member or short upright socket 49 bolted down upon the general base 50, upon which the tall standards 30 and other fixed parts also are supported.

In the rotor, outwards of its hollow hub 52 are further hollow members 60 building the rotor outwardly, as a system of expanding sectors, to where at the rotor periphery the pockets 89 are mounted, all as more fully shown in said patent. The rotor thus is built up from its central hollow hub 52 by concentric series of hollow structural members 60, the whole acting as a carriage rotating to advance each of the pockets facewise around the orbit of travel, the outer two of the hollow rotor components 60 being shown in Fig. 3, which also indicates the radial and the transverse webs constituting the sectors of the rotor. It is sufficient to designate the outermost or circumferential cross web or rim wall 65, which carries the radially outward projecting relatively fixed parts 88 that constitute the bases of the system of pockets. As a detail of structure each length of peripheral wall 65 is formed with a boss 66 which is hollow or bored to receive certain parts of the pocket supports, there being one boss for each pocket. At a point approximately halfway between the hollow rotor hub 52 and the rim wall 65 is provided a shelf 69, extending clear around the upper side of the rotor and upon which are secured the several upstanding brackets 71 which at their upper ends carry the ring gear 72 as already described.

In order to steady the rotation of the rotor or pocket conveyor 51 it is provided with a rolling support means near its periphery. Thus a large wear ring 74 is attached beneath the peripheral rotor wall 65; this ring resting upon a system of several supporting rollers 75 mounted at the top of short brackets 76 attached to the machine base 50. As thus stabilized the rotor may be power-driven from the drive motor 85 by the train of elements 84 to 76 as already described.

The many pockets are secured radially to the periphery of rotor 51, that is, substantially at right angles to the direction of travel or radial to the general axis of the rotor. For each pocket is provided a pocket base member 88 outstanding from the rotor rim, shown as a rod fastened in the rotor boss 66 provided on the rotor rim 65. Thus there may be sixty of these radial brackets or rods 88, each giving support to one of the pockets 89, the rod serving as an axle for certain pocket movements. Each pocket comprises essentially its upright leading wall 90 fixed to the base rod and the trailing wall 91 swingable to and from the leading wall for the top opening and closing of the pocket, and as well tiltable on its carrying lever 104 for the bottom opening and closing of the pocket. In initial position each pocket, ready to receive a jacket, is closed at its bottom near the base rod 83 but is open at the top, providing the pocket space to receive first the jacket and later the inner sections. Fig. 18 indicates the cycle of pocket wall movements in the handling of the sections for each assemblage. Following the deposit of the jacket the trailing wall is first swung upward to the leading wall initially to bring the jacket to its upright position, whereat its leading half is held while its trailing half is swung away with the trailing wall, leaving the jacket space open to receive the remaining sections; beyond which one of the pocket walls, preferably the trailing one, is tilted for the bottom opening of the pocket, this operating at the outfeeding position and releasing the assemblage to drop or dump to the delivery and other devices below. In effect the trailing wall has a double-jointed mounting, affording the necessary bodily swinging movements, about a low axis, and the tilting movements, about a middle axis, effected in proper sequence by means such as fixed cams operating by reason of the advancing travel of the series of pockets, as shown and more fully described in said patent. In Fig. 3 the pocket 89 is advancing away from the observer, the leading wall 90 being partially concealed by the trailing wall 91.

The relatively fixed pocket wall 90, as shown in Figs. 3, 16 and 18 is attached as by welding in nearly upright position on the base rod 88, but with preferably a slight backward slant, facilitating the falling away of the jacket trailing half when the trailing wall is swung away for the opening of the jacket. The upstanding leading wall is formed with a bent foot portion 93 composed of several tabs between cutaway portions, the tabs being secured to the base rod and the cutaway portions forming recesses for the accommodating of complementary tabs 99 formed along the lower edge of the trailing wall. At its upper inner portion each leading wall 90 is formed with an outwardly extended triangular corner area 94, Fig. 3, tapering downwardly to the upright edge of the wall, the slanted edge thus formed having a flange for the mounting of an inclined guide strip or band 95 extending entirely around the rotor and attached to all of the leading walls 90; this both steadying the pockets and by its slope assisting the proper guiding downwardly of the newspaper sections into the pockets. The upright wall 90 also is constructed to take part in the opening of the jacket section, for which purpose its upper margin 96 is bent over in the direction of travel, away from the pocket interior, to about 60°, thus providing an inclined triangular area over which one half of the jacket section may be bent. The bend line for the top margin 96 is shown commencing at the upper inner corner of the wall 90, slanting outwardly and downwardly as shown, the margin 96 being perforated with a hole 97 of ample size to accommodate the action of the suction holding device shown in Fig. 17.

In said patent, to bend over the upper margin of the jacket upon the inclined margin 96 of the leading wall there was provided a corresponding bend in the upper part of the trailing wall, so that when the latter wall closed against the former the jacket upper edge was forced upon the triangular area 96 of the leading wall, and within reach of the suction hole 97 so that suction could hold the leading half and allow the trailing half of the jacket to return with the trailing wall. An improvement thereon is herein disclosed particularly in Figs. 3, 17 and 18. A wiper device 200 is provided, at a fixed position on the path of the pocket travel, near position 2, the device acting while the pocket is top-closed, so that when it again opens the device will have brought the upper portion of the leading half of the jacket within the influence of the suction applied at the hole 97 formed in the bent area 96 of the leading wall. The device 200 is mounted upon a shaft 201, which may be constantly driven in such time that it will operate as described. On the hub of the device are a plurality of wiping means preferably in the form of resilient strips, herein termed brushes. The direction of rotation is clockwise as seen in Figs. 17 and 18 and one of the brushes, acting upon the entire thickness of the jacket, applies the forcible wiping action, before the trailing wall has receded, so that the suction, by that time applied through the Fig. 17 device, will hold the leading half but release the trailing half of the jacket. The trailing half may fall away from its brushed position by gravity, which may be aided by a mechanical means. Before each pocket passes beyond reach of the wiper device the jacket has become secured in its full opened condition, which remains in effect until all of the inner sections have been deposited within the jacket or until the pocket reaches the delivery position.

As explained, each pocket has to be double acting, so that while initially open at top and closed at bottom it may then be closed at top followed by opening at top, these motions to open up the jacket section, while at a later stage the top-open pocket is shifted so as to open at the bottom and thereafter close at the bottom in readiness for a new cycle. As in said prior patent the top opening and closing are by swinging about a low axis, an oscillating frame or wall-carrier being used for this purpose, upon which frame in turn the trailing wall is pivoted about midway of its height to receive tilting movements for the bottom opening and closing, about a horizontal axis, which may be parallel to the rod or axle 88; and these swinging and tilting actions of the trailing wall are brought about by timed means operated by reason of the travel of the respective pockets around the general orbit. Herein, however, the means and mechanisms affording these functions are reorganized in a way to secure simpler and more efficient operations and results. The present mechanism is best seen in Figs. 3, 4, 5, 16 and 18.

The swinging frame 204 which carries the trailing wall 91 of each pocket, while allowing its tilting, is shown as a built up carrier swingable about the low base rod 88 which is fixed on the rotor and acts as an axle for the swing. For rigidity there is a higher rod or frame member 205 parallel to 88 and connected tightly to inner and outer arms or radial bars 206 and 208, the hubs 207 and 209 of which can turn loosely on the lower axle rod 88. The tilting mounting of the trailing wall 91 on the swinging frame top rod 205 will be described; but first the actuating connections for swinging the frame for the top opening and closing, this mechanism being similar to that in said patent. Forming a rocklever with arm 206 and hub 207 is an extension drop arm or tail 114 having a follower or cam roller 117 cooperating with a non-traveling actuating means as a fixed cam 118 supported on bracket 119 and timed to swing the carrier 204 as the pocket advances, first to close and then open the pocket. As arranged, gravity may tend to open the pocket, or a spring 115 may be added. The low cam 118 is preferably of only short length along the travel line. It affords only the single function of swinging the carrier frame 204. Unlike the prior patent only the higher contours of the cam have the function described, so that the cam does not need to extend entirely around beneath the rotor as in the patent. The tendency of the frame or carrier is to swing reversely to the travel, thus to open the pocket, whereas the cam 118 is to overcome this tendency, at and near position 2 so as to swing forwardly the frame and close the pocket. When the follower 117 is not engaged upon the elevated contour of cam 118 means is required to stop and limit the opening swing; and for this purpose the rotor carries, for each pocket, a short upstanding post 211, its top end having a stop surface to be met by a contact surface on the frame, being shown in the form of an adjustable screw 212 preferably projecting from the rear side of the swinging arm 206 of the frame, all as best shown in Fig. 18.

Coming to the tilting of the trailing wall 91, which only occurs after the wall has been swung from the Fig. 1 to the Fig. 2 position and back to the Fig. 3 position, the tilting taking care of the bottom-opening of the pocket for delivery of the product and its reclosing, the arrangement may be as follows, referring to Figs. 3–5, 16 and 18. About midway of the height of the wall 91 is an axle 214 affording the tilting movements. On this rockaxle 214 the wall is mounted tightly, to rock with the axle, by means of mounts 215 shown in the nature of straps or clamps; and for its oscillation or tilting action the axle 214 is extended at its ends and receives bearing in the upper ends of the swinging arms 206 and 208 of the swinging frame 204. The rockaxle is held against longitudinal displacement by means of collars 216 attached at the two sides of the upper end or head of the arm 206. Thus, by rocking the axle 214 the trailing wall can be tilted from its inclined position No. 3 to its upright position No. 4, causing the dumping of the product, with reverse tilt to initial position 1. To rock thus the axle 214 and wall 91 the axle is provided with an upwardly extending rockarm 217 which may stand at an initial slant of about 45°, as seen at position 1 but which may be swung down considerably further as in position 4, under timed action, preferably by a fixed cam. At its outer or free end, for this purpose, the rockarm 217 is shown as carrying a cam follower or roll 218, which normally is unengaged, but which when the tilting action is to occur becomes engaged, by the travel of the pocket, with the underside of a fixed cam 220 mounted at the foot of a drop bracket 221 which may be an extension of the hangers 28 at the delivery station of the machine as seen in Fig. 3. As seen in Fig. 5 the cam has an underneath slanting surface 222 followed by a dwell 223, the cam being so positioned that as each pocket travels its rockarm 217 presents its roller 218 to the inclined surface 222 which thus thrusts downwardly the roll and tilts the rockarm and axle counterclockwise, thus tilting the pocket wall 91 from its bottom-closed position to its bottom-open position, with a return movement when the follower runs off from the cam contour. In Fig. 5 certain successive positions are shown, which may here be explained to clarify the camming action.

On Fig. 5 these tilting actions are made clear as follows. The full lines show the normal position at top-open condition, the cam roll 218 being slightly lower than the dotted position occupied when the pocket is top-closed at position 2. At its normal elevation as at position 3 the roll of the advancing pocket is low enough to cut under the entering or first part of the cam down-slant 222, at 218a, as marked. The continued travel causes the roll to run down to the full lower level 218b, thus rocking the arm 217 and tilting the wall 91 to its dumping position 4. The cam is shown in dotted lines in Fig. 5 because its location there is abstract or diagrammatic, to aid explanation. The cam length may be abridged, with an upslant 224 following a short dwell, since there is no need to maintain the wall 91 at a tilt after the assemblage has dropped through at delivery.

When the wall 91 has returned to its normal or bottom-closed position 1, a stop is desirable to predetermine such position. For this purpose the collar or hub 216 of the tilting arm 217 is formed with a projection or stop lug 225 arranged to meet a stop surface on the swinging frame 204, such stop surface being conveniently the exposed end of the upper frame rod 205; these parts being indicated as in contact, in Fig. 5. Yielding means to hold the parts in stopped position consists of a tension spring 227 attached to a depending lug on the hub of the rockarm and extending leftward to a convenient point 226 on the frame 204, as on the swinging arm 206, at about the level of the lug. Thus normally the spring 227 holds the wall 91 at bottom-closed position, determined by the stop 225, while the fixed high cam, near position 4, overcomes the spring and temporarily rocks the parts and tilts the wall to bottom-open position. These actions are wholly independent of the actions of the low cam 118 and at a different part of the cycle.

The wiper device 200 has been referred to as operating upon the jacket top edge to press it toward the leading wall top edge and thus bring the packet into reach of the suction means and of the clamping means to be described. It is shown in Fig. 18 position 2 as acting in advance of the clamping device to make sure that the leading half of the jacket shall remain in position against the pocket leading wall. The arrangement may be improved further by having two of the wiping devices in succession. The first wiper in that case will function initially to press the entire jacket top margin against the suction corner of the pocket leading wall, thus to insure that the front leading half will take its proper position along with the trailing half. Any separator, such as a curved blade, may then be inserted between the two halves of the jacket and operated to detach the trailing half, leaving the leading half at the leading wall. The sweeping through of this blade breaks the tendency of the two halves to adhere to each other. The second wiper may then come into play to insure that all of the individual sheets contained within the leading half of the jacket shall remain snugly in position against the leading wall. This acts just ahead of the closing of the clamper or gripper to be described which reaches over the top of the wall and presses the jacket half thereto, thus supplementing the suction holding of the jacket half.

Another improvement consists of a holding device or clamper adapted to reach over the top of the leading wall 90 and press upon the jacket half, to hold it to the wall, by way of supplementing the suction and wiping actions near the corner of the bent top margin of the wall. This device comprises, for each pocket, a rockshaft 229 on which a clamper or holding finger 230 is mounted, or several such clampers if desired. See Figs. 3, 4, 5 and 18. The rockshaft is positioned closely above and substantially parallel to the top edge of the leading wall 90 and it takes its bearings in an outer bracket 231 upstanding from an outer circular strip or band 233 secured by stud 234 to the wall 90 or extending directly from the leading wall itself; the inner end of the rockshaft turning in a bracket 232 upstanding slantingly from the inner guide wall or band 95 which extends around the orbit, from pocket leading wall to wall, as does the outer band 233, of the rotor. There may be a stop means or lug 228 limiting the rocking movement of the shaft 229.

The operation of the clamper device 230 will be understood by reference to Fig. 18. Position 1 shows the clamper retracted upwardly. Before the pocket has reached position 2 the wiper device 200 has pressed the jacket section A including its leading half A³ against the slanted upper margin of the leading wall. At this time, while the suction is in effect, the clamper 230 comes into play, being rocked downwardly to overreach the pocket wall and press the half jacket against it. This condition continues to and beyond position 3 at which the pocket has been widely opened and inner sections are being deposited therein. Before reaching the discharge position 4 the clamper 230 has been retracted in preparation for the release and descent of the assemblage from the pocket.

The rocking of shaft 229 and clamp finger is through an arc between 45° and 90°, and the means acting on the rockshaft for that purpose may be as follows. The rockshaft has collars 229ª and 229ᵇ for both ends holding it against longitudinal shifting in its bearings, and at its inner end it carries two independent levers 235 and 236. The whole system may be under substantial friction so as to retain the parts in either set position, or the principle of spring snap action may be used. Automatic operation is provided. The upper rock lever 235 cooperates with a fixed pin 237, projecting from the fixed bracket 221. With the advance of each pocket, as the upper lever 235 meets the fixed pin 237, the advancing travel causes the lever to swing against the direction of travel, thus rocking the clamp shaft 229 and bringing the finger down upon the jacket half section, holding it firmly against the leading wall. When the lever has passed beyond the pin these parts become inactive, but at a later point in the travel, beyond position 3, the lower lever meets and cooperates with a lower pin 238, the result being a reverse rocking movement which restores the parts to the original condition with the clamper retracted upwardly. The pins 237 and 238 are shown in Fig. 3 only abstractly to illustrate how the action can take place, the lower pin being in fact considerably further around the path than is indicated. The friction to hold the clamper 230 in either adjusted position may be provided by a friction washer 239 on shaft 229 Fig. 3 under tight compression between collar 229ᵇ and bracket 232.

Another useful device by way of improving the operation of the machine is a section-registering or aligning mechanism shown on sheet 2, Figs. 9 to 12, with reference also to Fig. 3. This device is cooperable with the guard means 94, 95 already described as comprising a radially inward triangular extension 94 of the upper-inner corner of the leading wall 90, the upper part of this extension overhanging the lower part and the general length of the pocket wall. Thus the wall 90 is lengthened at this particular part, the inner boundary of which is formed at an incline, and attached to this inclined edge, at each of the pockets around the entire orbit, is a continuous strip, band or connecting wall 95, which thus constitutes a strengthening brace from pocket to pocket, steadying the structure and operations, and at the same time constituting a guard or guide, with respect to each pocket, aiding in the safe deposit of each section, from the hoppers above, into the opened pocket. Thus if a section is received too near the general axis it will be steered outwardly by the incline of the strip or band wall 95. Fig. 12 shows the general setup although there the section is supposed to have been misplaced, not too far inwardly to be rectified by the guard 95 but too far outwardly, as will be further referred to. Either misplacement of the section tends to cause a disalignment whereas a correct alignment is of definite value.

When, in the course of travel of any pocket, a section fails to be fed into the pocket it is desirable that this may be readily corrected manually in the absence of a workable mechanical means for the purpose. In a short period of time the attendant thereby has the task of setting down into the pocket a duplicate of the missing section. Ordinarily he will place this correctly as regards its true position along the radius, but occasionally the manual deposit may be erroneous in setting down the section a little too far out from the center, the guard wall 94, 95 preventing the section being entered too far inwardly. Fig. 12 shows that when the section is deposited too far from the center its outer edge and lower corner may then overlap with and come down upon the metal end parts of the pocket. This is what has happened in Fig. 12 so that the section becomes cocked or takes a slanting posture. In such a case of course the newspaper assemblage will not become discharged correctly from the pocket when it is opened at the delivery station.

For general reasons it is desirable that all of the sections constituting an assemblage be lined up accurately in each pocket, whatever the cause of disalignment. The mechanism shown in Figs. 9 to 11 is provided to operate against the outer part of each section as received in the pocket, to press the same inwardly to a predetermined position, so that when the full complement of sections has been received they stand neatly gathered or stuffed, in readiness for a clean discharge and subsequent manipulation between the pocket discharge and the final outfeeding conveyor or belt 121.

Fig. 9 shows in top plan view several parts from other figures supplemented by the parts necessary to constitute the aligning mechanism of the device under discussion. Each of Figs. 9, 10 and 11 shows the outer upright frame arm 208 of the swinging frame of a pocket but in these figures the arm 208 takes a different contour and structure, having certain recesses to accommodate parts of the aligning mechanism. Figs. 9 and 10 show the fixed base or rod 88 from which extends rigidly the leading pocket wall 90 and around which oscillates the frame 208—205—206. The new parts are associated with the recessed arm 208 which extends between the fixed rod 88 below and the cross rod 205 above. Let it be assumed that successive sections have been fed somewhat irregularly into each pocket, that is, somewhat out of mutual alignment, and requiring re-positioning for the purposes hereof. Each of the three figures indicates the position of a jacket A and inside of it a section B and Fig. 10 in addition shows at the upper part of a section the cocked position that it might take when deposited too far removed from its correct position, although on account of the inner guard 95 the sections may be expected to be misplaced outwardly and not inwardly from correct positions; and the work of the registering mechanism therefore is to thrust inwardly, toward the general vertical axis, each section that has been misplaced outwardly. The illustrated part directly concerned in this action is the registering finger or aligner 240, having movements toward and from the general center. This aligner part may in a sense be considered as a movable guard, not merely guarding each section from misplacement but operating to thrust each section into a predetermined position, thereby aligning the entire assemblage, section by section; so that when the delivery is reached the sections have all been brought into correct registry.

Referring in detail to the section-registering mechanism, the aligning finger 240 is shiftable, preferably swingable, inwardly toward the position of the accumulating sections. Its normal position is within a recess in the inner side of the enlarged frame arm 208, wherein there is provided a stop or set screw 241 to predetermine the retracted position. The finger 240 is shown as fulcrumed on a stud 242 upstanding from the frame arm 208, the finger thus having play between the enclosed full line position and the operating dotted position shown in Fig. 9. The hub 243 of the finger 240 rocks upon the stud 242, and from this hub extends a lateral lug 244 having a socket to receive one end of a spring 245 disposed under compression tending to rock the hub and retract the finger into its recess. The far end of the spring 245 is shown entered in a socket formed in an abutment 246 provided at the outer side of the frame arm 208. By these arrangements the registering finger remains always retracted except at those times when a force is applied to swing inwardly the finger, for the registering in the pocket of each section as received therein.

The actuation of the registering finger 240 is shown performed by means of mechanical connections cam-operated. On the same hub 243 of the finger there extends outwardly a cam arm 247 and at the extremity thereof is shown a cam roll 248; these parts being shown in full lines in the retracted position and in dotted lines in the advanced or operating position of the finger. The described parts must be operated regularly in time with the other motions of the machine including particularly the travel of the pockets and the successive depositing of sections therein. For each section, including the jacket if desired, the registering action is performed at a point of time promptly after the deposit of the section. A satisfactory mode of actuation is to provide a fixed cam 250 cooperable with each cam roll 248, the cam being set in the path of travel of the rolls, and each cam being set at such position along the path of travel that it will be engaged by the cam roll of the registering finger of each pocket. The contour of the cam may be a simple first incline or wedge surface, to shift the cam roll and connected parts against the resistance of the spring 245, the apex of the cam determining the extent of swing and register, followed by an easy decline to the end of the cam; the parts then remaining under spring control until, as the pocket passes another depositing station a subsequent similar cam is necessary for repeating the registration on the next received newspaper section.

Reviewing the actions of the low and high cams 118 and 220, these jointly conform with the position numbers 1, 2, 3 and 4 which are indicated on Fig. 18 and as well on Fig. 1. At position 1 the pocket, open at top but closed at bottom, receives the jacket section deposited from above. Neither cam is in effect, the swinging frame and the tilting wall being positioned by their stops 211 and 205. At position 2 there is no infeed hopper, but the interval between positions 1 and 3 is used for opening the jacket section to receive the inner sections. Thus the cam 118 rises to a peak and thence drops to normal, the intermediate mechanism causing the trailing wall to swing bodily to the leading wall, closing the pocket, followed by return to open position, the auxiliary means already described causing the jacket to open in the pocket and remain so up to the discharge position. Therebeyond the cam 118 tapers away from its peak and may be discontinued or absent therebeyond around to a point beyond position 1 for repetition of action. In each of the successive positions 3 an inner section is fed from above into the opened jacket, six such positions being shown on Fig. 1 although only a smaller number thereof may need be used for the assembling of the sections of any particular newspaper. Each pocket beyond the last position 3 comes to position 4, which is the delivery position, wherein cam 220, and not cam 218, brings about the operations, the trailing wall 91 being first tilted from its inclined posture of position 3 to its tilted upright posture of position 4, thus dumping the complete assemblage, and the cam 220 thereupon restoring the wall from its tilted to its original inclined position. As with the low cam 118 the high cam 220 is of open structure, the follower being spring-pressed, and in each case the follower rides off the reverse incline of the cam at a point beyond which the cam may be terminated, leaving the parts in their spring-pressed stopped position. Each of the sixty pockets goes through the described cycle in each complete turn of the rotor, delivering sixty complete products per rotation, all of the pocket sections being under the control of the low and high cams 118 and 220. The delivery of the stuffed newspapers from the successive pockets, traveling in rapid succession through the delivery position 4, may thus be caused by gravity directly downward to the receiving and transferring means therebelow, leading eventually to the outfeeding conveyor or band 121, traveling in this case leftward at an adjustable speed such as to cause the assemblages to be laid in overlapping relation as seen in Figs. 2, 7 and 8.

The outfeeding conveyor 121 preferably travels somewhat slower than the pocket travel speed while passing the delivery, so that the pockets can have no retarding effect upon the upper parts of the discharging products. Indeed the higher speed above ensures that each product will flop over advancingly as its lower part is slowed by its engagement with the slower moving compartments of the spider wheel. The bottom closing of each pocket is timed to await the complete exit of each product therefrom, by the length and timing of the fixed high cam 220. It is sometimes useful to arrange that after the openable upper edge $A^2$ of each product has been laid down to overlap upon the preceding one, its closed lower edge A' shall get deposited, not directly upon the belt conveyor, but upon a short shelf from which the final deposit takes place, the product sliding off the shelf onto the conveyor. Such a horizontal shelf is indicated as part of bracket 273 in Fig. 7; and it may be slotted to accommodate the transverse movements of the kicker 270 as each tenth product is kicked laterally out of line with the intervening products.

Several devices for manipulating the jacket section and its two halves, for the opening of the jacket and holding it thus to receive inner sections, have already been described as auxiliary to the primary or suction holding means provided for each pocket to hold the leading section of the jacket to the leading wall 90. The details of the suction means may be ascertained from the disclosure in said prior patent, but the following may be here mentioned in connection with Fig. 17. The suction holding device 124 as a whole is mounted upon a block 126 which in turn is carried on a bracket 125 secured to the outside face of the leading wall 90. The block is centrally open to accommodate the suction nozzle or terminal 128, which protrudes slightly through the suction hole 97, at the inner face of the wall, at its triangular bent portion 96. The suction timing and control means is not shown, but may be analogous to that in said patent, operating through a flexible tube 132 to supply and relieve suction in suitable timing to hold the jacket half to the leading wall until after all of the inner sections have been received. The suction device may contain interior mechanism providing a certain automatic application of the suction by the bringing of the jacket into contact upon the mouth of the nozzle 128, for example, as in said patent shown.

The delivery mechanism, including transfer at position 4 of assemblages discharged from the successive pockets for orderly deposit upon the outfeeding conveyor 121 are best shown in Figs. 6, 7 and 16, with some reference to Figs. 1, 2, 13 and 18. The immediate receiving element, which may be designated as a spider wheel 255, is a driven device, which is of skeleton structure comprising several individual wheels 255; the spider wheel being formed with a plurality of projecting vanes or arms 256 which are disposed or bent in a manner to provide an equal number of recesses 257 adapted, in turn, to receive the successive discharged assemblages. With four such arms and recesses the spider wheel makes one rotation during the passage of four pockets above the wheel. The wheel is driven in time with the discharges from above, and its rotation causes each assemblage or product to lie over in the direction of outfeeding progress, thus to be received smoothly upon the conveyor, in overlapping relation however with the products already so deposited. The result of using this spider wheel is indicated in the perspective view of Fig. 8.

The spider wheel 255 as a whole, and its three sections, are all mounted upon a horizontal shaft 259, which may have its mid-portion flattened in square form for the attachment to the shaft of the spider wheel sections; or the spider wheel may have a single hub to be mounted upon the shaft in a conventional way. The spider wheel shaft is shown in Figs. 13 and 16 as being mounted to turn in a front or outer bearing 260 and a back or inner bearing 261. For timing the shaft 259 to turn in harmony with the other operations of the machine it may be geared to be driven from the rotor 51, as best seen in Figs. 7 and 16. The shaft 259 carries a sprocket gear 262 on which runs a chain 263 which also is engaged upon a smaller sprocket gear 264 mounted upon a countershaft 265, which carries also a larger gear 266 which is shown in mesh with, so as to be driven from, the large lower ring gear 78 on the rotor 51. The countershaft 265 may turn in bearings 267, the inner one of which is shown mounted upon a bracket 268 upstanding from a lower box or block constituting part of the machine base 50. The transfer shaft 259 is parallel to the radial pocket and directly below it, as are also the curved recesses 257 defined by the skirts of the spider arms. The cam-tilting of the trailing wall opens widely the pocket bottom, letting the product C drop into the recess 257 which is in the path of descent. The product substantially reaches the level of shaft 259, while the preceding and following skirts 256 preclude the flopping over or loss of position of the product. When each product is overlaid upon the preceding one it smoothly takes its position while the supporting arm or skirt pulls away, completely releasing the product. The spider wheel is at a high level close to the bottom level of each pocket and the outfeeding conveyor is close up to the lower level of the wheel; so that the entire operation takes place smoothly and while all of these parts are in advancing motion, the pocket traveling on the rotor, the transfer wheel with its receiving compartments turning about a horizontal axis, and the outfeeding belt advancing in the same direction as that in which each product is slid out of its compartment on to the belt. The total arrangement is compact, so that the pocket travel with the rotor is conveniently low, as is desirable for maintaining observation and operation of the various steps and mechanisms.

A machine having no further mechanisms or operations than already described would be complete and operative, but would require in connection with the manual removal of the products at the far end of the outfeed conveyor, not only a lifting away but in due time a counting of the products to provide piles or batches of a predetermined number for shipment. Auxiliary mechanism will next be described by which for example every tenth product is automatically counted off and displaced, thrust or kicked out of line, at or near the deposit point on the conveyor, by way of facilitating the counting and further handling.

The kicking mechanism comprises primarily a displacing member or kicker in the nature of a swinging dog or thrust bar 270, acting under control upon every tenth product for example to shift it out of line in the lateral tilting manner indicated in Fig. 8, wherein the products are normally overlaid in regular procession but periodically one is caused to stand away e. g. cornerwise. Referring first to Figs. 6, 7 and 16, the displacing member or kicker 270 is mounted to swing on a pivot 271 supported at the lower end of a drop bracket 272 located well below the level whereat the products are deposited overlappingly upon the conveyor belt 121; the kicker being near the radially inward side of the conveyor, which Fig. 16 shows to consist of three separate belts 121, so that when the kicker is swung through its operative motion, from the full line to the dotted line position in Fig. 16, its free end or horn swings outwardly, leftwardly in Fig. 16, away from the general center, and by this swing it engages the last deposited product or assemblage C, and with a movement lateral to the travel offsets the product to stand out noticeably from the general line of products. As indicated, the horn of the kicker preferably engages, not the middle part of the product edge, but its rear corner, so that the displacing motion may consist of a lateral tilting shift rather than a bodily lateral or longitudinal displacement.

The drop bracket 272 which gives support to the swingable kicker member is shown as mounted at the underside of a low radial angle iron 273, the radially inner end of which is supported by brackets indirectly from the base block 50, the outer or front end of which angle iron is clamped to one of the upright standards 30 of the general frame of the machine. It being desirable to locate the kicker controlling mechanism accessibly near the periphery of the machine there is shown a connecting means for causing the periodic oscillating thrust of the kicker in the form of a long longitudinal link 275, the fittings and operation of which will be explained, this link having a pivotal connection 276 with the middle part of the kicker.

In addition to the low angle iron 273 on which several parts are mounted including the kicker bracket 272 and others to be mentioned, there are various fixed walls, brackets and other frame members designed and connected to give support to various movable parts of the kicker and control mechanisms to be described. Most of these fixed parts have their mounting upon certain of the upright frame columns or standards 30 or similar columns upstanding from the base 50 for the purposes hereof. Thus in Figs. 6, 7, 13 and 16 there appears a general upright frame plate 278 clamped or bolted to two of the columns; and at the outer side of the general plate 278 is an extensive horizontal angle iron 279. Among other fixed parts is a pair of angle brackets 281, whose base flanges are secured to the frame plate 278 and which are spaced apart to provide a bearing for a swinging lever 285, with a cross bolt or axle pin 282 serving as the fulcrum for this purpose.

The kicker or thrust bar 270, as stated, shifts transversely to the path of outfeed travel, engaging and displacing the last deposited product or newspaper, which thus becomes disaligned, and, due to the cornerwise thrust, becomes askew and thus noticeably subdivides the procession into batches.

The operating mechanisms beyond the end of link 275 include first of all, connected to the link by a pivot 284, a kicker actuator or depending lever 285, which has an interposed yoke 286 somewhat above the link end, and at its top an enlarged hub or lever head 287 that is fitted between the bracket angles 281 and can swing at regular times about the crossaxle 282 to pull the link and thus operate the kicker; the lever head carrying part of the trip mechanism taking part in the action, as will be described. Fig. 16 shows the normal or idle link and lever positions, and in dotted lines their shifted positions as occupied momentarily after each tenth product has been deposited in the outfeed. As a preferred way to control and restore the normal positions, a compression spring 288 is placed between a socket hole in the fixed plate 278 and a socket recess in the lever head. When non-operative the spring returns the parts, while a stop-piece 289, near the low end of the kicker lever predetermines the normal position, with the kicker bar retracted to a position well inward of the path of the outfeeding assemblages. This is the normal position of kicker 270, shown in full lines in Fig. 16 as clearing the inner edge of the assemblage C; while Fig. 7 shows that the kicker tip is lower than the spider wheel and offset endwise in the direction of travel, so as to act on the trailing corner of the latest deposited product before the next one comes to rest thereupon.

The mechanisms for determining the kicking intervals, at which the otherwise regular deposit of products on the out-feeding belt occur, include a trip or finger 300 mounted on the upper end or head of the kicker actuator lever 285, cooperating with a driven rotary cam or tripping element 291, referred to also as a star member or cam owing to its having a plural number of similar tripping arms; and in addition to these a timed mechanism for rendering active or operative the otherwise passive or idle star member and trip member. These three sets of controlling and operating means are best shown in the front elevation of Fig. 6, looking toward the general axis, the top plan view of Fig. 13 and the side elevation looking in the direction of pocket travel in Fig. 16.

Describing first the star member 291, which is driven from the rotor 51 or another general machine part in coordination with the kicking and tripping actions, this is shown with a central hub 292 fast on the radial shaft 259 and from which extend four radial arms 293 each of which has a tripping cam face 294, near the end of the arm and slanted to constitute a cam adapted to coact with the trip finger 300. Being on the same driven shaft 259 with the four-armed spider wheel 255, these mechanisms work in perfect coordination, with the deposit of a newspaper product in each quarter turn of the shaft, and the readiness of the star cam to take part in the tripping action in any predetermined cycle, such as every tenth cycle of delivery; the shaft 259 being geared down, as already described, in receiving its rotary motion from the lower ring gear 78 of the rotor.

Normally the trip member or finger 300 stands out of the path of the four cam faces of the star cam 291, e. g. at a point between these faces and the hub; but when the tripping occurs, in the manner to be described, the trip finger becomes shifted to a position in the path of the cams, so that the next arriving cam can engage and thrust down upon the finger 300 and thus cause the bodily swinging of the kicker lever 285, whose hub or head carries the finger, the force thus exerted on the finger being thus applied to swing outwardly the lever and thus, through the link 275, deliver a single outward and return action to the kicker, by which the last deposited product is engaged at its corner and kicked, thrust or tilted laterally out of line for the purposes described. As the cam face which performs this action continues rotation it passes from engagement with the finger and all parts return to normal.

The trip member 300 comprises a movable or rockable finger mounted by its hub 301 upon the kicker lever head 287 to rock between its normal idle position and its shifted position with which one of the cams 294, cooperates to displace the finger and thereby rock the lever. The lever head is open or forked at its inner side, providing a space within which the hub 301 of the trip finger is accommodated. For effecting the movements of the trip its hub 301 is mounted upon a short upright rockshaft 302, to which the finger is pinned and which has its bearings in the forks of the lever head. This rockshaft has an upward extension beyond the upper fork, and upon this extension is secured a collar 303 which may also be the hub of a rockarm 304.

The rockarm 304 is an important element in the train of connections, and when it is rocked it can shift the trip finger to and then from its operative position, being that position in which the free projecting part of the trip finger comes into the path of the cam ends of the star cam arms 293. In Fig. 13 is shown in full lines the normal or idle position of the trip finger, while in dotted lines is shown the position to which it becomes shifted by the rocking of the arm 304, the projecting portion of the trip finger then being below the descending cam face 294 of the next one of the rotary arms 293. Thereby the star member arm comes down upon the trip finger, which at its upper side has a cooperating incline or cam face. The result of these actions is that, by the timed rocking and depression of the trip finger, there is caused a bodily swinging movement of the actuator lever 285 and its head 287, so that, in opposition to the compressed spring 288, the lever is swung outwardly, pulling the long link 275 and thereby actuating the kicker 270 to displace the single product thus selectively determined under the timed control yet to be described.

In order to hold the trip finger 300 normally in its retracted idle position a spring 305 is applied to the trip, as to the rockarm 304, with the spring pulling in a direction to hold these parts in the full line position of Fig. 13; and with a stop 307 suitably determining this idle position, such as a part of the lever head 287 or one of the twin brackets 281.

For tilting the trip finger, as through the swinging of the rockarm 304, a mechanical connection or link 309 is employed, which may have a rod portion 310 and a cushioning helical spring portion 311 of good strength to transmit the motion and with normally closed convolutions; these two portions being in tandem and the link 309 as a whole extending from the rockarm 304 to where the far end of the rod portion may have a hook or other coupling 312 to another mechanical part or swing arm 320 to be described.

As a practical means for transmitting timed actuation to these parts, for the periodic tripping and kicking actions, an electromagnetic means is shown in the form of a solenoid 314 which is energized by a circuit 315, these parts being shown both in Figs. 6 and 16. The motion transmitting solenoid may have a conventional core 316 which shifts inwardly when the solenoid is energized. By a pivot 317 the outer end of the core is connected to the first lever arm 318 of a bellcrank lever which is fulcrumed at 319 and whose second arm 320 is thus adapted to be swung from and toward the trip rockarm 304 during each periodic operation of energizing and deenergizing the solenoid. This swinging bellcrank arm 320 is formed with a number of coupling points or holes 321 for adjustment purposes, to determine the effective length and throw of the arm, a selected one of which holes is shown engaged by the coupling hook 312 of the link 309, so that when the bellcrank is swung from its normal idle position shown it pulls upon the link and thus swings the rockarm 304 and tilts the trip 300 from its idle to its active position. The early cutting off of the current and release of the solenoid causes these parts to return to their normal or idle condition due to the stress constantly applied by the retracting spring 305.

The timed product-counting operations and the energizing of the solenoid 314 for the described purposes may be effected from a convenient driven member of the machine, as for example from the upper ring gear 72 of the rotor 51. Thus, on the small-scale showing of Fig. 1 the gear drives a bevel pinion 324 carried on a shaft 325, which shows also in the larger-scale Fig. 16. See also Figs. 14 and 15. The shaft 325 operates through a speed reducer consisting of a worm 326 driving a worm wheel 327, the shaft 328 of which carries also a switch-controlling wheel or disk 329 shown in the form of a sprocket or chain wheel.

The parts here under description may be considered as constituting a counting mechanism, performing the function of counting the stuffing operations and determining the point of time for each kicking action, and communicating this control through the solenoid and parts beyond for this purpose. The slow turning controller wheel 329 might carry directly and cause progress of an outstanding pin or finger 331 serving as a periodically acting actuator for a suitable switch 333, such as a time limit switch, to be described, so that, for example, the controller pin 331 will make one complete revolution or cycle for every ten products, thereby to operate the switch and so energize the solenoid 314 after each ten deliveries to cause the tripping and kicking actions already described. The wheel or disk 329 can also be provided with means for directly or indirectly adjusting peripherally thereon an operating pin, or a plurality thereof, to positions to meet any particular demand as to segregating the newspaper products into batches. Instead of fitting a controller pin or pins directly upon the wheel 329, however, an indirect and more flexible arrangement, as shown, is to apply an elongated sprocket chain or similar endless flexible control element 330 to the wheel 329, which is toothed for the purpose, the chain hanging loosely thereon to any desired length determined by the number of links therein, the chain being interchangeable. The chain may carry an operating pin or finger 331, or there may be two or more of such pins, spaced evenly around the length of the chain and each one adjustably attachable thereon. Brackets 332 give support to the chain counting mechanism, with an extension bracket for the switch 333.

The actuating operation of the counting mechanism chain pin may consist substantially in its thrusting of the operating part or button 334 of the switch, which naturally may be of any well known or conventional type. The time switch 333 is shown conventionally, without details, but with the circuit conductors 315 issuing from it and with an outstanding switch pin or button 334. The switch is fed by line wires 335 and is of a type wherein the circuit is normally open, but is adapted to be closed by the thrusting inwardly, against spring resistance, of the switch pin 334; this action being performed by the counting pin 331 as the slowly traveling chain brings the chain pin opposite to the switch pin, thus thrusting or camming the switch pin inwardly, causing a reversal of switch conditions from open to closed circuit, which may be by snap action; the continued travel of the counting pin beyond the switch pin thereupon releasing the latter, while inner spring means of the switch comes into action to restore outwardly the switch pin and thus break the circuit leading to the solenoid. Time switches of such characteristics are available on the market, of several makes.

To review the results of the arrangements described, the switch controlling pin 331, when set for a cycle of ten products, for example, as driven from the ring gear 72, at the designated moment closes and then opens the switch 333 and circuit 315, thus briefly energizing the solenoid 314, and acting through connections 318, 320, 309 and 304 to rock the trip finger 300 into the descending path of the next arm of the star cam 291, which thereupon depresses the trip and thus swings frontwardly the kicker lever 285, to cause the kicker to displace laterally the tenth product, according to the object of these arrangements.

Reverting to the deposit of the successive products from the several compartments 257 of the spider wheel 255, having in this case four arms or recurved vanes defining the recesses or compartments, it is sometimes desirable to supplement the arrangement by providing a means, such as shown in Figs. 6 and 16 for insuring the depositing action by ejecting or stripping each product from its compartment. For this purpose there is shown a fixed stripping member or blade 340 attached to and upstanding from the fixed bracket 273. There should be a plurality of the fixed stripping blades or plates near or between the sections 255 of the spider wheel, two of the strippers being shown spaced well apart with the spider wheel sections between them. The upper part of each stripper is in the nature of a wedging plate, which preferably overlies and rests against a cylindrical part of the spider wheel shaft 259, so that as the shaft and spider sections rotate, with a product in each compartment, the upper end of the stripper acts directly upon the approaching backfold A' of the stuffed product whereby the stripper enters between the product and the shaft, its edge riding the shaft, and thus wedges the product outwardly in any case where there exists some resistance to the gravity deposit or outsliding of the product from the compartment. In structure, each stripper 340 may have a lower extension or body 341 by which it is mounted upon the frame bracket 273, a suitable mounting being the providing of upper and lower stems projecting horizontally from the stripper body and passing through holes in the bracket, thus permitting sliding adjustment of the stripper relatively to the spider wheel shaft. As thus set in its operative position the stripper may be secured upon the bracket by upper and lower attaching screws 343; and the mounting may be completed by the provision of a collar 344 fast upon the lower stem 342, held by a pin or screw.

There has thus been described a stuffing machine embodying the principles and attaining the objects and advantages of the present invention; but since many matters of operation, combination, construction and detail may be variously modified without departing from the underlying principles, it is not intended to limit the claims to such matters except to the extent set forth in the appended claims.

What is claimed is:

1. Machine for stuffing newspapers or like products of the kind having an advancing carriage or driven rotor supporting an endless series of substantially upright and normally top-open V-shape stuffing pockets arranged radially to travel facewise around a horizontal orbit through successive stations and at the jacket station to receive from above and carry along first a jacket section and then at receiving stations therebeyond inner sections of newspaper within the jacket; means to open into V-shape the received jacket section in each pocket in advance of receiving inner sections stuffed thereinto and to so retain the jacket until the stuffing is completed; the leading and trailing opposite walls of each pocket being relatively shiftable or swingable normally to maintain the pocket top-open and bottom-shut during reception of sections and therebeyond at the delivery station to open the pocket bottom for dumping the stuffed product or assemblage; and an underneath outfeeding conveyor web operable to receive the successive dumped products and convey them away in a direction diverging from the orbital path of pocket travel; and, in combination therewith, an operable transfer mechanism comprising a recessed spider wheel located below the delivery station and intermediate between the pocket series above and the outfeeding conveyor below and adapted to receive in its recesses, the successive stuffed products and to support and manipulate them for the methodical smooth lowering, laying over and depositing thereof in orderly overlapping relation upon the outfeeding conveyor and said spider wheel being formed with several outstanding arms providing flared compartments for receiving and depositing the successive products, with a horizontal spider-carrying shaft and means for driving the shaft and spider in coordination with the travel and operation of the series of pockets.

2. A newspaper stuffing machine having an orbitally advancing carriage supporting an endless series of normally top-open V-shape radial stuffing pockets arranged to travel through successive stations and at the jacket station to receive and carry along first a jacket section and therebeyond inner sections within the jacket; means to open into V-shape each received jacket section in advance of receiving inner sections stuffed thereinto and to retain thus the jacket until the stuffing is completed; the leading and trailing opposite walls of each pocket being relatively shiftable normally to maintain the pocket top-open and bottom-shut during reception of sections and therebeyond at the delivery station to open the pocket bottom for dumping the stuffed assemblage; and an underneath outfeeding conveyor adapted to receive the successive dumped products and convey them away divergingly from the path of pocket travel; and in combination therewith a recessed spider wheel below the delivery station and intermediate between the pocket series above and the outfeeding conveyor below, the same adapted to receive in its recesses the successive stuffed products and to support and manipulate them for the methodical smooth lowering, laying over and depositing thereof in orderly overlapping fashion upon the outfeeding conveyor; and said spider wheel being formed with several outstanding arms providing flared compartments for receiving and depositing the successive products, with a horizontal spider-carrying shaft and means for driving the shaft and spider in coordination with the travel and operation of the series of pockets.

3. A stuffing machine as in claim 2 and wherein the spider arms are in sets, back-curved, and each set being adapted to tilt each product over and down flatwise for deposit overlapping previous deposits while sliding from such arm set advancingly in the direction of pocket and conveyor travel.

4. A stuffing machine as in claim 2 and wherein is a stripping means in the form of a fixed ejector blade or wedge riding upon the spider shaft and by wedging action aiding in the final descent and deposit of each product from its compartment to the web.

5. Machine for stuffing newspapers or the like of the kind having an advancing carriage in the form of driven rotor supporting an endless series of substantially upright and normally top-open V-shape stuffing pockets arranged radially to travel facewise around a horizontal orbit through successive stations and at the jacket station each to receive from above and carry along first a jacket section and then at receiving stations therebeyond inner sections of newspaper within the jacket; means to open into V-shape the received jacket section in each pocket in advance of receiving inner sections stuffed thereinto and to so retain the jacket until the stuffing is completed; the leading and trailing opposite walls of each pocket being relatively shiftable or swingable normally to maintain the pocket top-open and bottom-shut during reception of sections and therebeyond at the delivery station to open the pocket bottom for dumping the stuffed product or assemblage; and an underneath outfeeding conveyor web operable to receive the successive dumped products and convey them away in a direction diverging from the orbital path of pocket travel; said machine being characterized in that each traveling V-pocket has a leading wall and an opposite trailing wall which latter is mounted on an upstanding lever-frame fitted to swing bodily with the trailing wall about a low radial axis located at the V-point of the pocket, and the trailing wall being fitted also to the frame to tilt bodily about a radial mid-axis on the frame, a low fixed cam with a cam connection to cause the timed swing of the frame and trailing wall, and a separate high fixed cam with its cam surface higher than said mid-axis and with a cam connection to cause the tilt of the trailing wall, including a swing arm at said mid-axis with a follower engageable with said surface, these lever-swing and wall-tilt movements being caused respectively by said low and high cams by reason of the travel of each pocket; said cams being arranged and timed for the low cam to cause the top-closing and then opening of each pocket after receiving a jacket section, and later for the high cam to cause the bottom-opening and then closing of the pocket by the low-cam-tilting of said trailing wall, thereby to dump the product after the pocket has received the inner sections.

6. Machine for stuffing newspapers, such machine having a rotatively advancing carriage supporting an endless series of upstanding, normally top-open, radially disposed V-shape stuffing pockets arranged to travel through successive stations and at the jacket station each to receive a jacket section and therebeyond inner sections at other stations; means to open into V-shape the received jacket section in each pocket in advance of receiving inner sections thereinto and to retain thus the jacket until the stuffing is completed; the leading and trailing walls of each pocket being relatively swingable normally to maintain the pocket top-open and bottom-shut during reception of sections, and therebeyond at the delivery station to open the pocket bottom for dumping the stuffed product; and an underneath outfeeding conveyor operable to receive and carry away the successive stuffed products; said machine being characterized in that each V-pocket has a leading wall and a trailing wall which latter is mounted on an upstanding frame fitted to swing bodily with the trailing wall about a low radial axis located at or near the V-point of the pocket, and the trailing wall being fitted also to the frame to tilt bodily about a mid-axis on the frame, a low fixed cam with a cam connection to cause the timed swing of the frame and trailing wall, and a separate high fixed cam with a cam connection to cause the tilt of the trailing wall, these lever-swing and wall-tilt movements being caused respectively by said low and high cams by reason of the travel of each pocket; said cams being arranged and timed for the low cam to cause the top-closing and then opening of each pocket after receiving a jacket section, and later for the high cam to cause the bottom-opening and then closing of the pocket by the low cam-tilting of said trailing wall, thereby to dump the product after the pocket has received the inner sections; the machine being further characterized in that the trailing wall is carried tiltingly on the swingable frame by means of a rocking axle, which latter has a rockarm with follower cooperating with the high cam for the tilting action, with a stop member on the frame determining the normally retracted bottom-closing position of the tilting wall, and a spring means holding such rockarm and wall in such stop-determining normal position.

7. Machine for stuffing newspapers, such machine having a rotatively advancing carriage supporting an endless series of upstanding, normally top-open, radially disposed V-shape stuffing pockets arranged to travel through successive stations and at the jacket station each to receive a jacket section and therebeyond inner sections at other stations; means to open into V-shape the received jacket section in each pocket in advance of receiving inner sections thereinto and to retain thus the jacket until the stuffing is completed; the leading and trailing walls of each pocket being relatively swingable normally to maintain the pocket top-open and bottom-shut during reception of sections, and therebeyond at the delivery station to open the pocket bottom for dumping the stuffed product; and an underneath outfeeding conveyor operable to receive and carry away the successive stuffed products; said machine being characterized in that each pocket is provided with an aligning device in the form of a swingable finger arranged to shift endwise from a retracted position determined by spring and stop means to an advanced position well within the pocket; and a fixed means or cam operating by reason of the travel of the pocket and acting through a rockarm to cause such endwise shift to a predetermined inside position, after the receipt of each section in the pocket; whereby to shift and align all the products received in the pocket in each cycle before delivering the assemblage.

8. Machine for stuffing newspapers or the like of the kind having an advancing carriage or driven rotor supporting an endless series of substantially upright and normally top-open V-shape stuffing pockets arranged radially to travel facewise around a horizontal orbit through successive stations and at the jacket station to receive from above and carry along first a jacket section and then at receiving stations therebeyond inner sections of newspaper within the jacket; means to open into V-shape the received jacket section in each pocket in advance of receiving inner sections stuffed thereinto and to so retain the jacket until the stuffing is completed; the leading and trailing opposite walls of each pocket being relatively shiftable or swingable normally to maintain the pocket top-open and bottom-shut during reception of sections and therebeyond at the delivery station to open the pocket bottom for dumping the stuffed product or assemblage; and an underneath outfeeding conveyor web operable to receive the successive stuffed products and convey them away in a direction diverging from the orbital path of pocket travel; and, in combination therewith, means for periodically displacing the last-received product on the outfeeding conveyor thereby to mark off predetermined batches, comprising a kicker member mounted adjacent to the reception point of the conveyor and adapted for transverse shift to contact each predetermined last-received product and thrust it out of line, normally idle actuating means adapted to cause such periodic kicker action; and timed control means for predetermining and effecting the idle intervals and times of action of such displacing means; a cyclic source of power connected for driving and operating the stuffing pockets, and connections from said power source timed for operating the actuating means for causing the coordinated periodic action of the kicker member.

9. A stuffing machine as in claim 8 and wherein the kicker member is pivoted to swing about a horizontal axis below the level of the outfeeding conveyor, with an up-reaching extension to contact the rear part of the latest deposited product; and wherein is a kick-lever for actuating the kicker and link-connected thereto, whereby the swinging of the lever from and to normal idle position causes the kicking action and return of the kicker, with a driven actuator member for the lever.

10. A stuffing machine as in claim 9 and wherein for throwing the lever is a driven rotary actuator or star-cam, with several actuating arms, combined with a normally idle trip device between the star-cam and the kick-lever such that when tripped the star cam throws the lever, together with timed control means to cause the trip device to assume its active position.

11. A stuffing machine as in claim 10 and wherein the trip device comprises a rocking trip finger mounted on the kick-lever head, with a rockshaft through which the finger is shifted, means tending to restore the rockshaft and trip finger to idle position, and timed connections to rock them to active position.

12. A machine for automatically stuffing newspapers, such machine being of the kind having an advancing carriage in the form of a driven rotor supporting an endless series of upstanding and normally top-open pockets arranged to travel around a horizontal orbit through successive stations and at the jacket station to receive and carry along first a jacket section and then, at other receiving stations therebeyond, inner sections of newspaper within the jacket; means to open each received jacket section in each pocket in advance of receiving inner sections and to retain thus the jacket section until the stuffing of the assemblage is completed; the leading and trailing wall members of each pocket being relatively shiftable normally to maintain the pocket top-open and bottom-shut during reception of sections, and therebeyond, at the delivery station, to open the pocket bottom for dumping the stuffed assemblage; and an underneath outfeeding conveyor operable to receive the successive stuffed products in overlapping sequence and convey them away in a direction diverging from the orbital path of pocket travel; and, in combination therewith, and characterizing such machine, mechanism for periodically displacing the last-received product of each batch on the outfeeding conveyor, thereby to designate predetermined batches thereof, said mechanism comprising a kicker member mounted adjacent to the reception point of the conveyor and adapted for transverse shift in a path to contact each predetermined last-received product of each batch and thrust a part or corner thereof out of line, normally idle actuating means adapted to cause such periodic kicker action; and timed control means for predetermining and effecting the idle intervals and times of action of such displacing means; a cyclic source of power connected for driving and operating the stuffing pockets, and connections from said power source timed for operating the said actuating means for causing the co-ordinated periodic action of the kicker member.

13. A stuffing machine as in claim 12 and wherein the kicker is pivoted to swing about a horizontal axis below the level of the outfeeding conveyor, with an up-reaching extension to contact the rear part of the latest deposited product in each batch, and wherein is a kicker-lever positioned for actuating the kicker, and link-connected thereto, whereby the swinging of the lever from and to normal idle position causes the kicking action and the return of the kicker to normal, with a driven actuator member for the lever.

14. A stuffing machine as in claim 13 and wherein for throwing the lever is a rotary actuator or star-cam, with several actuating arms, combined with a normally idle trip device between the star-cam and the kick-lever such that when tripped the star cam throws the lever; together with timed control means to cause the trip device to assume its active position.

15. A stuffing machine as in claim 14 and wherein the trip device comprises a rocking trip finger mounted on the kick-lever head, with a rockshaft through which the finger is shifted, means tending to restore the rockshaft and trip finger to idle position, and timed connections to rock them to active position.

16. In a stuffing machine of the class described, having inter alia the general drive for the stuffing and delivering means, and an outfeeding conveyor for receiving one at a time the procession of stuffed products deposited thereon; and in combination therewith, means to demark a division of the procession into predetermined groups, comprising, a shiftable kicker member of curved hook shape normally retracted but mounted to be operated periodically to reach contact and displace the last deposited product in such procession; with a kick part or lever to operate the kicker; a normally idle trip member shiftable on the lever at predetermined intervals to its active tripping position, and connections from the trip to the kicker to shift the kicker by the active operation of the trip; whereby the trip is adapted to cause the shift of the lever; a constantly driven actuator having an extension adapted to contact and operate the trip only when the trip is in its active position, whereby the kick part or lever is shifted and the kicker is actuated; and a timed means operated from the general drive of the machine and operating to cause the trip, at predetermined intervals, to shift from its idle to its active position, thereby to cause the operation of the kicker.

17. A stuffing machine as in claim 16 and wherein the connections from the trip to the kicker comprise the swingable part or kicker lever on the head portion on one extension of which the trip member is movably mounted and on another extension of which the lever is linked to the kicker.

18. A stuffing machine as in claim 17 and wherein is a spring means retracting the kicker and lever, with a stop limiting such retraction to a limited extent allowing the kicker to clear normally the outfeeding conveyor and the products thereon.

19. A stuffing machine as in claim 16 and wherein the timed means operating periodically to cause the trip to shift to and from its active or tripping position, comprises a counting mechanism operating continuously through cyclical connections from the general drive, and transmitting means therefrom to the trip.

20. A stuffing machine as in claim 19 and wherein the transmitting means comprises a switch closed and opened by the counting mechanism at the designated cyclic intervals, a magnetic solenoid in circuit with and energized and deenergized from the switch, and mechanical connections from the solenoid to swing the trip member into and from tripping position.

21. In an automatic stuffing machine of the class described, having inter alia the general drive for the stuffing and delivering means, and an outfeeding conveyor for receiving in single file the procession of stuffed products deposited thereon; and in combination therewith means to demark a division of the procession into predetermined groups, comprising, a shiftable kicker normally retracted but mounted to be operated at regular intervals to reach contact and displace the last deposited product of each batch in such procession; with a kick member or lever to operate the kicker; a normally idle trip member shiftable on the lever at predetermined intervals to its active tripping position, and connections from the trip to the kicker to shift the kicker by the active operation of the trip; whereby the trip is adapted to cause the shift of the lever; a constantly driven actuator having an extension adapted to contact and operate the trip only when the trip is in its active position, whereby the kick lever is shifted and the kicker is actuated.

22. A stuffing machine as in claim 21 and wherein there are connections from the trip to the kicker which comprise the swingable kicker lever, on one extension of which the trip member is movably mounted and on another extension of which the lever is linked to the kicker.

23. A stuffing machine as in claim 22 and wherein is a spring means retracting the kicker and lever, with a stop limiting such retraction to a limited extent allowing the kicker to clear normally the outfeeding conveyor and the products thereon.

24. A stuffing machine as in claim 21 and wherein the timed means operating periodically to cause the trip to shift to and from its active tripping position, comprises a counting mechanism operating continuously through cyclical connections from the general drive, and transmitting means therefrom to the trip.

25. A stuffing machine as in claim 24 and wherein the transmitting means comprises a switch closed and opened by the counting mechanism at the designated cyclic interval, a magnetic solenoid in circuit with, and energized and deenergized from, the switch, and mechanical connections from the solenoid to swing the trip member into and from tripping position.

PAUL SCHWEIZER.

References Cited in the file of this patent

UNITED STATES PATENTS

| Number | Name | Date |
| --- | --- | --- |
| 1,117,000 | Curry | Nov. 10, 1914 |
| 1,841,711 | Cannon | Jan. 19, 1932 |
| 1,956,541 | Spillane | Apr. 24, 1934 |
| 1,961,724 | Zenke | June 5, 1934 |
| 2,048,765 | Wood | July 28, 1936 |
| 2,161,033 | Foster | June 6, 1939 |
| 2,461,573 | Schweizer | Feb. 15, 1949 |